United States Patent [19]

Yarris

[11] 4,035,040
[45] July 12, 1977

[54] SELF-ALIGNING WHEEL MOUNTING STRUCTURE

[75] Inventor: William T. Yarris, Brook-Park, Ohio

[73] Assignee: Towmotor Corporation, Mentor, Ohio

[21] Appl. No.: 703,728

[22] Filed: July 9, 1976

[51] Int. Cl.² .......................................... F16C 23/08
[52] U.S. Cl. .................................. 308/72; 301/5.7; 308/190
[58] Field of Search .................. 308/16, 17, 18, 20, 308/72, 190, 194; 187/9; 301/5.7

[56] References Cited

U.S. PATENT DOCUMENTS

| | | | |
|---|---|---|---|
| 1,689,930 | 10/1928 | Place | 308/190 X |
| 1,928,114 | 9/1933 | Scheffler | 308/194 X |
| 3,365,253 | 1/1968 | Haller | 308/190 |

Primary Examiner—Joseph F. Peters, Jr.
Assistant Examiner—Gene A. Church
Attorney, Agent, or Firm—Charles E. Lanchantin, Jr.

[57] ABSTRACT

A self-aligning wheel mounting structure is disclosed of the type including a supporting axle shaft, an annular tread portion, and a bearing assembly mounted on the axle shaft for permitting the tread portion to make rolling engagement against a load bearing surface. Advantageously, the bearing assembly is limitedly permitted to rock on the axle shaft for improved self-aligning force transmission between the axle shaft, the bearing assembly, the tread portion, and the load bearing surface.

7 Claims, 1 Drawing Figure

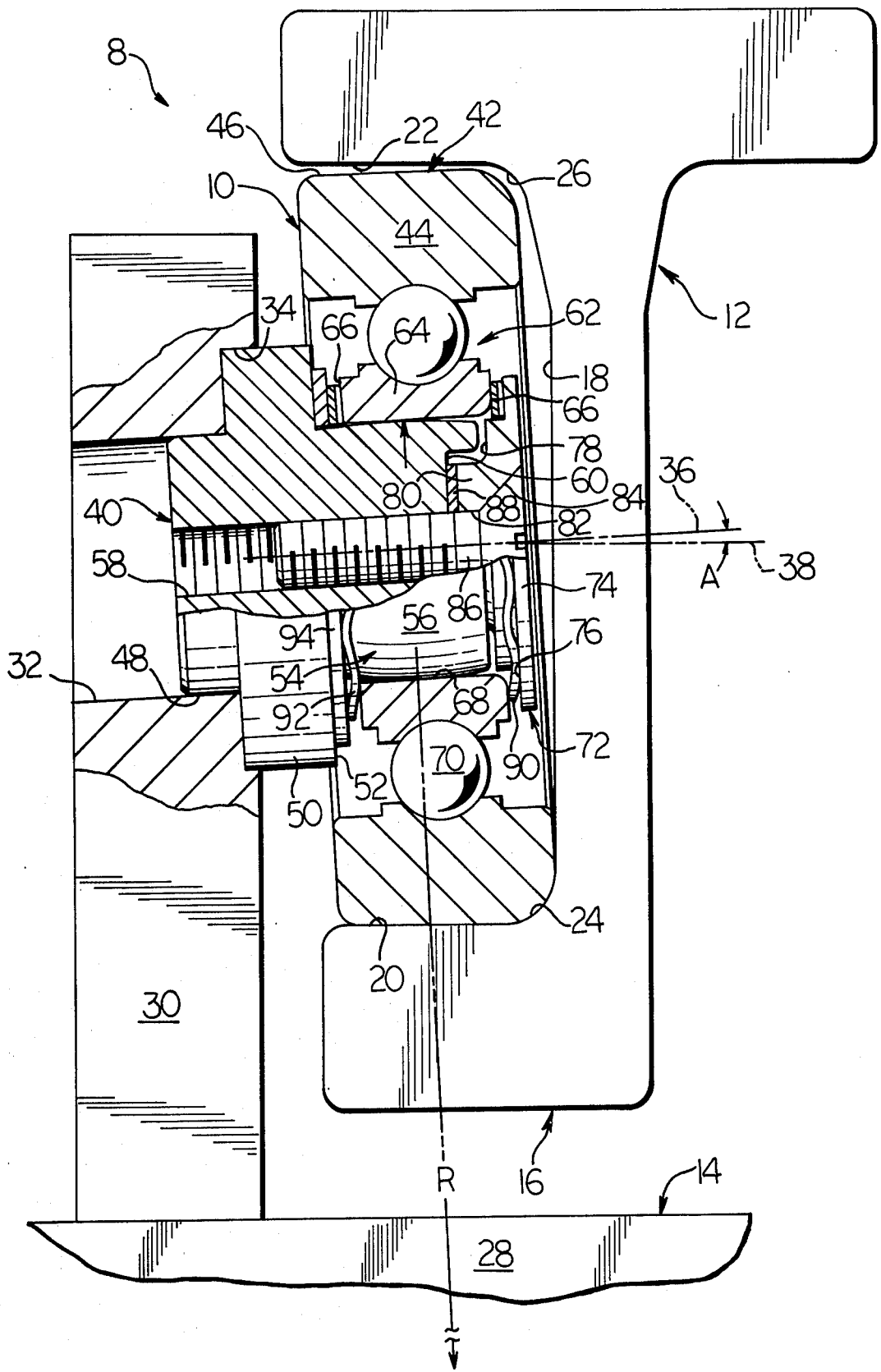

SELF-ALIGNING WHEEL MOUNTING STRUCTURE

BACKGROUND OF THE INVENTION

The present invention is related to a wheel mounting structure having a tread portion which is limitedly permitted to rock into an improved self-aligning force transmitting relationship with a surface with which it is rollingly engaged. Advantageously, a plurality of such wheel structures may be used in a lift mast mounting arrangement of a fork lift truck.

Lift mast mounting arrangements of the type shown in U.S. Pat. No. 3,851,732 and issued to R.A. Wagner et al on Dec. 3, 1974, and assigned to the assignee of the present invention, are well known. In general, they include a first frame which is longitudinally moved within a second frame by disposing a plurality of rigidly mounted wheels or guide rollers therebetween. Unfortunately, while such lift mast mounting arrangements have been well accepted, the roller engaging rail surfaces continue to experience considerable wear and surface flasking after an extended period of operation. This is a result of a relatively small area of total contact between the hardened steel tread portion of the wheels and the rail surfaces upon which they roll. Thus, high contact stresses are generated which increases to even higher levels with distortion of the rail surface or with slight misalignment of the rigidly mounted rollers. In order to minimize these stresses, close control of the frame material has been found to be necessary, along with close control of manufacturing and assembly tolerances. Despite all these precautions, excessive wear of the roller engaging rail surfaces of the frames continues to be experienced.

SUMMARY AND OBJECTS OF THE INVENTION

Accordingly, it is an object of the present invention to provide an improved wheel mounting structure which is better able to self-alignably transmit forces rollingly between the shaft on which it is mounted and a load bearing surface.

Another object of the invention is to provide a wheel mounting structure of the character described which will self-alignably react to imperfections in the load bearing surface to assure an optimum contact pattern therebetween.

Another object of the present invention is to provide such a wheel mounting structure which is especially adaptable to the lift mast mounting arrangement of a fork lift truck.

Other objects and advantages of the present invention will become more readily apparent upon reference to the accompanying drawing and following description.

BRIEF DESCRIPTION OF THE DRAWING

The sole figure is a diagrammatic, simplified, and fragmentary top plan view of a pair of relatively longitudinally movable frames of a lift mast mounting arrangement including a self-aligning wheel mounting structure in partial section which is constructed in accordance with the present invention.

DESCRITION OF THE PREFERRED EMBODIMENT

Referring to the drawing, a portion of a lift mast mounting arrangement 8 is shown which incorporates a representative one of a plurality of similarly longitudinally spaced apart self-aligning wheel mounting structures 10 which are constructed in accordance with the present invention. In general, it is to be appreciated that the lift mast mounting arrangement includes a first frame 12 which is suitably supported on a vehicle such as a lift truck, and not shown, and a second frame 14 which is longitudinally movably mounted thereon by way of the wheel mounting structures.

The normally rearwardly disposed first frame 12 includes an inwardly facing J-shaped channnular beam 16 of hot rolled alloy steel which provides good wear resistance. The beam includes an inwardly facing and generally longitudinally oriented web surface 18, and a front rail surface 20 and a rear rail surface 22 which are disposed substantially normal to and bordering the ends of the web surface. Moreover, it is to be noted that a front corner surface 24 and a rear corner surface 26 arcuately blend with the web surface and their respectively associated rail surfaces.

The second frame 14 is adjacently dispoded to the first frame 12 and includes an upright portion 28 and an upright elongated leg 30 which is weldably secured to the rear of the body portion. The leg is likewise preferably of steel which is oriented in the same direction as the longitudinally oriented web surface 18. Also, as is representatively shown, the leg has a transversely oriented pin bore 32 defined therein for each one of the wheel mounting structures 10, and a concentric counterbore 34 opens laterally outwardly therewith. Furthermore, the bore and the counterbore are oriented along a horizontally disposed central axis 36 which is canted or inclined at an angle, identified by the letter A in the drawing, of approximately 3° from a transverse plane 38 which is normal to the web surface 18.

More particularly, each of the wheel mounting structures 10 includes a supporting axle shaft or bearing support member 40 which is adapted to be tightly received in the pin bore 32. This bearing support member extends laterally outwardly from the leg 30 to serve as a mount for a guide roller assembly or wheel 42 which assembly inludes an annular tread portion 44 having a flat tapered or very slightly conical peripheral surface 46 thereon for making rolling engagement with the beam 16.

As is shown in the drawing, the axle shaft or bearing support member 40 includes a reduced diameter inner end 48 which if rigidly secured within the pin bore 32, and a centrally disposed flange 50 seatably mounted within the counterbore 34 and providing a laterally outwardly facing thrust surface or shoulder 52 thereon. In addition, it includes a reduced diameter outer end 54 which provides a slightly crowned bearing seat or convexly shaped peripheral surface 56 which is constructed in accordance with the present invention as will be discussed further below. Moreover, a threaded bore 58 is defined centrally and laterally through the support member which opens on an outwardly facing counterbore 60.

In the particular embodiment illustrated, each of the wheel mounting structures 10 includes a bearing assembly 62 having an inner race 64 with a pair of opposite end faces 66 thereon and an internal cylindrical bore 68 defined therein of slightly larger inside diameter than the maximum diameter of the crowned bearing seat 56. In this manner the inner race is rockably mounted on the bearing support member 40 and may axially slide a limited lateral distance thereon within the confines of the mounting structure. Furthermore, the bearing assembly also includes a plurality of antifriction ball bearings 70 which are equally spaced around the outer periphery of the inner race and are adapted to freely rotatably support the annular tread portion 44.

Incidentally, while only ball bearings 70 are illustrated in the instant embodiment, it is to be appreciated that other types of antifriction bearings, such as roller or needle bearings, may obviously be utilized with equivalent success without departing from the spirit of the present invention.

In accordance with one aspect of the invention, the inner race 64 is entrapped for limited axial movement on the crowned bearing seat 56 of the bearing support member 40. This is accomplished by utilizing a bearing retaining element 72 which includes in serially arranged order, an outer flange portion 74 having an axially inwardly facing thrust surface or shoulder 76 thereon, a centrally disposed cylindrical guide portion 78, and an axially inner smaller diameter body portion 80. The retaining element also has a bore 82 on the axis thereof and a tapered opening 84 openingly axially outwardly therewith to permit it to be secured to the bearing support member by screw threaded engagement of a self-locking retaining screw 86 in the threaded bore 58. One or more shim washers 88 may be optionally disposed between the retainer element and the counterbore 60 to assure more positive mounting of the retaining element on the support member, and to initially adjust the axial disposition of the thrust surface 76 relative to the thrust surface 52.

Thus, it is apparent that the inner race 64 of the wheel mounting structure 10 is axially entrapped between the thrust surface 52 and the thrust surface 76. However, pursuant to another aspect of the invention the inner race is continually axially biased to a central position on the crown bearing seat 56. This is achieved by locating an axially compressible resilient ring member 90 and an axially compressible resilient ring member 92 on either side thereof. Specifically, the ring member 90 is encirclingly disposed around the cylindrical guide portion 78 and in abutting engagement with the outer end face 66 of the inner race and the thrust surface 76. In a corresponding manner the other ring member 92 is disposed encirclingly around the outer end 54 of the support member 50 and in abutting engagement with the inner end face of the inner race, and one or more shims 94 optionally serially engaged therewith to transfer forces to the thrust surface 52. Preferably, and as shown in the instant example, both of the resilient ring member are annular metal wave washers of conventional construction so that it is apparent that the inner race, the ball bearings 70 and the guide roller assembly 42 is axially loaded from two directions toward a central position. Consequently, it is evident that the wheel mounting structure is not only self-centering, but also the inner race thereof is thereby limitedly allowed to rock on the slightly crowned bearing seat 56 for improved self-aligning force transmission and rolling engagement with the rail surface 20 and into cornering contact with the beam closely adjacent the web surface 18 thereof.

OPERATION

While the operation of the present invention is believed clearly apparent form the foregoing description, further amplification will subsequently be made in the following brief summary of such operation. With the self-aligning wheel mounting structure 10 of the present invention, it is to be noted that the central axis 36 thereof is inclined so that the peripheral surface 46 of the tread portion 44 is axially and radially engaged laterally outwardly into cornering engagement with the front rail surface 20 and the front corner surface 24. This advantageously position the area of contact axially deeply into the beam and nearer to the web surface 18, and combines with the structure's self-aligning capabilities to assure that forces are more positively transmitted from the second frame 14 to the first frame 12 by way of the bearing support member 40, the crown bearing seat 56, the inner race 64, the bearings 70 and the tread portion 44. Note that with this canted orientation, the laterally outwardly facing and rearwardly disposed portion of the tread portion has improved axial clearance from the web surface, and hence, the possibility of fractional scrubbing therebetween is substantially eliminated.

In accordance with one of the benefits of the invention, any lateral shifting movement of the first frame 12 relative to the second frame 14 results in a reduced transmission of lateral forces through the guide roller assembly 42 when compared to rigidly mounted prior art guide rollers, and a reduced transmission of noises because of such action. As may be visualized with respect to the drawing, any rightward movement of the leg 30 toward the beam 16 results in increased axial loading of the resilient ring member 92, since force is transmitted back through the tread portion 44 and the ball bearings 70 to hold the inner race 64 at a relatively fixed distance from the web surface 18. This is accomplished by the relatively limited axially outward sliding movement of the crowned bearing seat 56 within the inner race, which simultaneously decreases the amount of axial compression of the outer resilient member 90. Thus, while positive contact between the roller's peripheral surface 46 and the beam is assured, it is further apparent that the magnitude of the force transmitted laterally between them is limited by the physical parameters of the inner resilient ring member 92 which cushions the reaction.

Advantageously, only a limited amount of rocking movement of the guide roller assembly 42 is provided as mentioned heretofore. This is accomplished by controlling the degree of rocking movement of the inner race 64 by providing a very slight degree of crowning of the bearing seat 56. For example, with an outer end 54 having a maximum overall diameter of approximately 3.5 cm (1.375 inch) the bearing seat is generated by revolving the support member 40 with respect to a generally axially centralized radial arc having a radius of approximately 22.8 cm (9 inches) as indicated by the reference latter R in the drawing. This advantageously provides a very small degree of divergence or radial clearance intermediate the inner race and the support member at either end thereof in order to maximize the area of contact axially centrally between them. Preferably, to provide sufficient contact, the bearing seat is a generated surface of revolution defined by revolving a radial arc having a radius approximately three to ten times the maximum diameter of the shaft 40 on which the inner race 64 is mounted.

In view of the foregoing, it is readily apparent that the wheel mounting structure 10 of the present invention is better adapted to transmit working forces self-alignably to even a relatively uneven rail surface 20 and as axially close to the web surface 18 as is practical, while also adapting to any relative lateral movement therebetween. Moreover, while the tread portion 44 is advantageously adapted to angularly rock when transmitting forces rollingly against the rail surface, the axial transmission of forces between them is advantageously limited by the compression parameters of the resilient ring members 90 and 92. Furthermore, the axially resilient centering of the inner race 64 also permits easing up of the assembly tolerances of the wheel mounting structures relative to both of the frames 12 and 14 while still maintaining maximum contact of the tread portion.

While the invention has been described and shown with particular reference to a preferred embodiment, it will be apparent that variations might be possible that would fall within the scope of the present invention, which is not intended to be limited, except as defined in the following claims.

What is claimed is:

1. A self-aligning wheel mounting structure, comprising:
   a supporting axle shaft having a crowned bearing seat thereon;
   a bearing assembly having an inner race and a plurality of bearing elements peripherally disposed about said inner race, said inner race having a substantially cylindrical internal bore rockably mounted on said crowned bearing seat;
   an annular tread portion freely rotatably supported on said bearing elements; and
   resilient means on said shaft for axially biasing said inner race to a preselected position on said seat.

2. The wheel mounting structure of claim 1 wherein said axle shaft includes an annular thrust surface thereon, and said resilient means includes an axially compressible ring member disposed between said thrust surface and said inner race.

3. The wheel mounting structure of claim 2 wherein said ring member is a metal wave washer.

4. The wheel mounting structure of claim 2 including a retaining element which is secured to said axle shaft, and including another axially compressible ring member which is disposed between said retaining element and said inner race at the opposite end thereof.

5. The wheel mounting structure of claim 1 wherein said resilient means includes an axially compressible ring member in contacting engagement with each side of said inner race, said shaft and said ring members being of a construction sufficient for substantially axially centering said inner race on said bearing seat.

6. The wheel mounting structure of claim 1 wherein said crowned bearing seat is a surface of revolution having radial arc in the range of three to ten times the maximum diameter of said axle shaft.

7. A self-aligning wheel mounting structure, comprising:
   a supporting axle shaft having an external bearing seat;
   a bearing assembly having an inner race and a plurality of bearing elements peripherally disposed about said inner race, said inner race having an internal bearing seat;
   an annular tread portion freely rotatably supported on said bearing elements; and
   surface means for allowing limited rocking movement of said internal bearing seat of said inner race on said external bearing seat of said shaft, said surface means including interengaging contact of a substantially cylindrical surface with a crowned surface.

* * * * *